Jan. 25, 1938. P. J. HARDER 2,106,635
VETERINARIAN'S INSTRUMENT
Filed Aug. 14, 1936
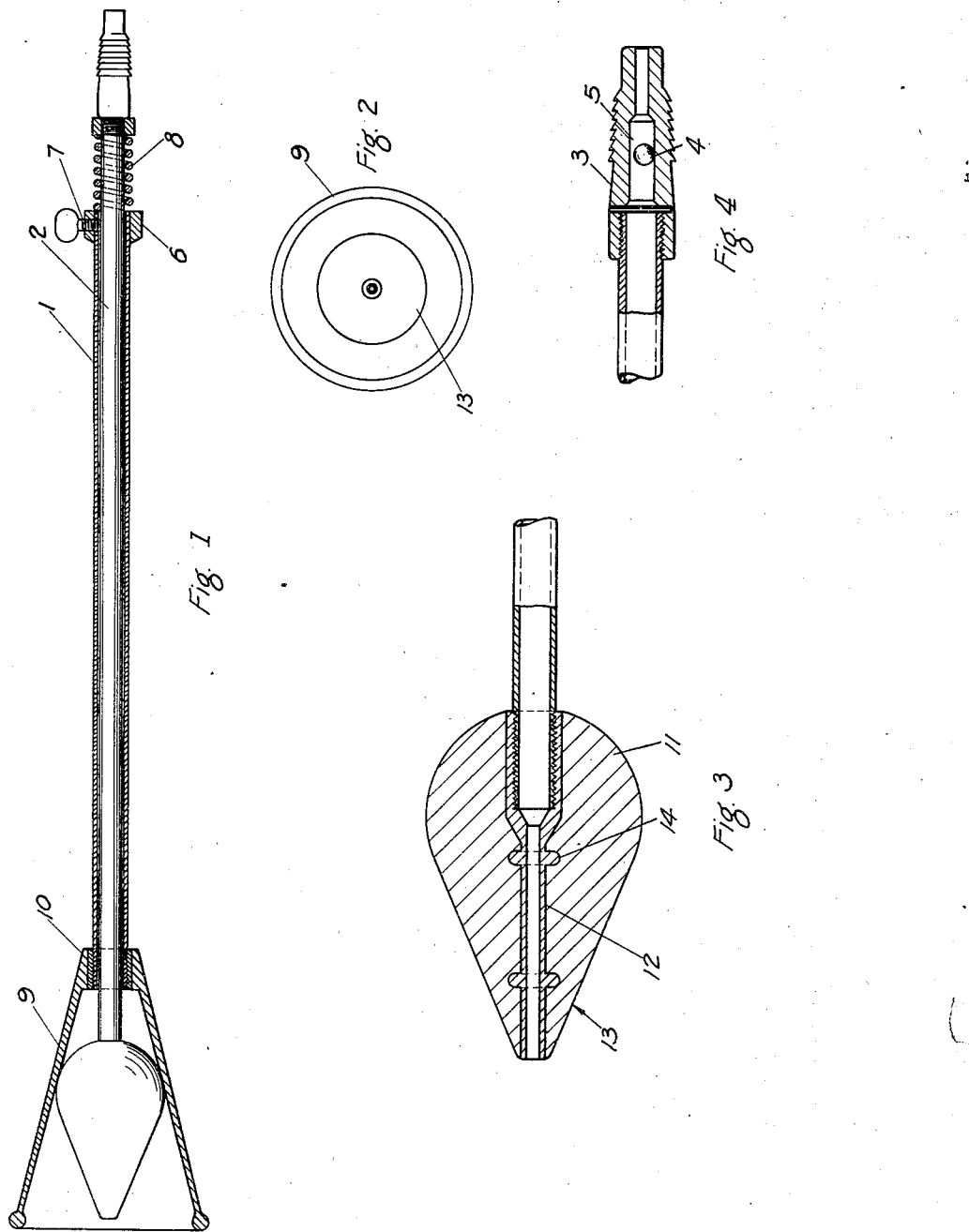
Perry J. Harder
INVENTOR
BY Victor J. Evans & Co.
ATTORNEY Patented Jan. 25, 1938

2,106,635

UNITED STATES PATENT OFFICE 2,106,635

VETERINARIAN'S INSTRUMENT

Perry J. Harder, Newalla, Okla.

Application August 14, 1936, Serial No. 96,107

1 Claim. (Cl. 128—239)

This invention relates to a veterinarian's instrument especially adapted for cleansing an animal's womb by the injection of a cleansing liquid therein or may be employed for injecting a seminal fluid into the womb for producing pregnancy, and has for the primary object the provision of an efficient and inexpensive device of this character which is simple and easy to insert in an animal and which assures thorough and positive injection of liquid into the interior of the womb and against the walls thereof.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view illustrating a veterinarian's instrument constructed in accordance with my invention.

Figure 2 is an end view illustrating the device.

Figure 3 is a fragmentary vertical sectional view illustrating the womb spreader.

Figure 4 is a fragmentary vertical sectional view illustrating a check valve.

Referring in detail to the drawing, the numeral 1 indicates an outer tube to slidably receive an inner tube 2, the latter is of a greater length than the outer tube and has threaded to one end a fitting 3 in the form of a valve cage in which operates a ball check valve 4. Serrations 5 are formed on the fitting 3 for retaining thereon a rubber tube or similar device leading to a liquid supply (not shown).

A collar 6 is secured to one end of the outer tube and has threaded thereto a set bolt 7 which passes through an aperture in the outer tube and contacts the inner tube for retaining the latter in adjusted positions. Interposed between the fitting 3 and the collar 6 is a coil spring 8 acting to slide the inner tube 2 in one direction relative to the outer tube 1.

The other end of the tube 1 is screw threaded and threaded into a womb engaging cup 9. The cup 9 is constructed of rubber or any other material suitable for the purpose and has a limited amount of rigidity and is of substantially conical shape. A ferrule 10 is secured in the apex of the cup 9 and is threaded to the outer tube 1. The inner tube 2 extends into the cup 9 and has secured thereon a womb spreader 11. Extending through the spreader 11 is a tube or ferrule 12 in which is secured one end of the inner tube 2. The womb spreader 11 is constructed of rubber or any other material suitable for the purpose and is substantially pear-shape having a portion of conical shape, indicated at 13, with the tube 12 opening outwardly through the apex thereof. Ribs 14 are formed on the ferrule or tube 12 and are embedded in the material of the spreader 11. The check valve 4 allows fluid to pass through the tube 2 and through the ferrule 12 of the spreader. However, reverse flow of the fluid through the tube 2 is prevented by said check valve.

In operation, the parts are positioned as shown in Figure 1 and the device is inserted in the animal with the cup fitting over the womb. The set bolt 7 is released and an endwise movement is made to the inner tube causing the spreader 11 to move outwardly relative to the cup and into the womb consequently spreading the womb and holding the same in a spread condition. The set screw 7 is then turned against the inner tube locking the parts in the position described. An antiseptic liquid is then passed through the inner tube from a supply (not shown) and into the womb by way of the tube or ferrule 12. The antiseptic liquid brings about a thorough cleansing of the interior walls of the womb. When it is desired to employ this instrument for injecting the seminal fluid, the device is placed in the animal as heretofore described and the seminal fluid is forced through the inner tube by any well known instrument, such as a syringe so that the fluid will enter the interior of the womb.

By slight modifications to this instrument it may be successfully employed for human use, the principal change being in the size of the parts and the inclusion of a return valve (not shown) in conjunction with check valve 4.

The device above described may also be employed for giving enemas by placing the cup exteriorly of the rectum and inserting the spreader into the rectum so that the liquid may readily enter the latter.

While I have shown and described the preferred embodiment of my invention, it will be understood that minor changes in construction, combination and arrangement of parts may be made without departing from the spirit and scope of my invention, as claimed.

Having described the invention, I claim:

A surgical instrument comprising an outer tube, an inner tube adjustably mounted in the outer tube, means for connecting the inner tube to a liquid supply, a substantially conical-shaped cup secured to the outer tube to receive a womb, and a substantially pear-shaped spreader secured to the inner tube and located in and movable outwardly of the cup to enter and spread the womb, said spreader having a passage therethrough communicating with the inner tube.

PERRY J. HARDER.